United States Patent
Lippert et al.

(10) Patent No.: US 10,422,983 B2
(45) Date of Patent: Sep. 24, 2019

(54) LIGHT MICROSCOPE WITH INNER FOCUSING OBJECTIVE AND MICROSCOPY METHOD FOR EXAMINING A PLURALITY OF MICROSCOPIC OBJECTS

(71) Applicants: Carl Zeiss Microscopy GmbH, Jena (DE); Max-Planck-Gesellschaft zur Förderung der Wissenschaften e.V., München (DE)

(72) Inventors: Helmut Lippert, Jena (DE); Jörg Siebenmorgen, Jena (DE); Jan Huisken, Dresden (DE); Florian Fahrbach, Heidelberg (DE)

(73) Assignees: Max-Planck-Gesellschaft zur Foerderung der Wissenschaften e. V., Munich (DE); Carl Zeiss Microscopy GmbH, Jena (DE)

( * ) Notice: Subject to any disclaimer, the term of this patent is extended or adjusted under 35 U.S.C. 154(b) by 0 days.

(21) Appl. No.: 15/038,755

(22) PCT Filed: Oct. 15, 2014

(86) PCT No.: PCT/EP2014/072090
§ 371 (c)(1),
(2) Date: May 24, 2016

(87) PCT Pub. No.: WO2015/078633
PCT Pub. Date: Jun. 4, 2015

(65) Prior Publication Data
US 2017/0160529 A1    Jun. 8, 2017

(30) Foreign Application Priority Data

Nov. 27, 2013 (DE) ......................... 10 2013 019 951

(51) Int. Cl.
*G02B 21/00* (2006.01)
*G02B 21/02* (2006.01)
(Continued)

(52) U.S. Cl.
CPC ......... *G02B 21/0004* (2013.01); *G02B 21/02* (2013.01); *G02B 21/025* (2013.01);
(Continued)

(58) Field of Classification Search
CPC .. G02B 21/0004; G02B 21/025; G02B 21/06; G02B 21/241; G02B 21/26
(Continued)

(56) References Cited

U.S. PATENT DOCUMENTS

| | | |
|---|---|---|
| 3,632,184 A | 1/1972 | King |
| 5,184,021 A | 2/1993 | Smith |

(Continued)

FOREIGN PATENT DOCUMENTS

| | | |
|---|---|---|
| DE | 19520926 A1 | 12/1996 |
| DE | 202008004271 U1 | 5/2008 |

(Continued)

OTHER PUBLICATIONS

Wittmann-Regis, A., International Application No., PCT/EP2014/072090, International Preliminary Report on Patentability—English translation, May 31, 2015, 13 pages.

(Continued)

*Primary Examiner* — Wen Huang
(74) *Attorney, Agent, or Firm* — LaBatt, LLC

(57) ABSTRACT

The invention relates to a light microscope for examining microscopic objects with high throughput. The microscope comprises a light source for illuminating a measuring zone, a sample vessel, in which the microscopic objects can be successively moved into the measuring zone, and a detection device for measuring detection light, which originates from (Continued)

Figure 1:
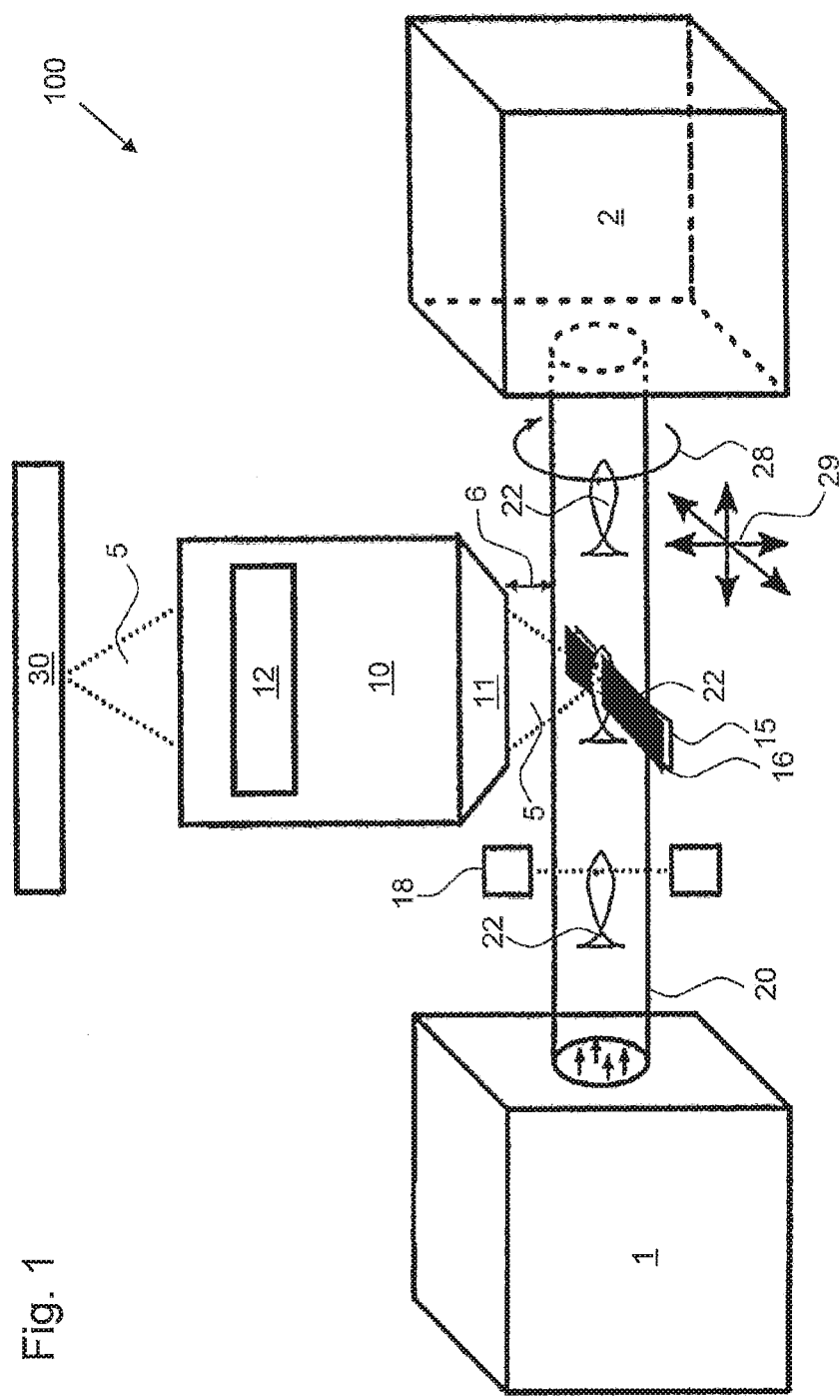

a microscopic object located in the measuring zone. According to the invention, the microscope is characterized in that the imaging means comprise a detection lens having a stationary front optics and movable focusing optics, wherein the focusing optics is arranged behind the front optics and in front of an intermediate image plane, and can be adjusted for the height adjustment of a detection plane. The invention further relates to a corresponding microscopy method.

13 Claims, 2 Drawing Sheets

(51) Int. Cl.
*G02B 21/34* (2006.01)
*G02B 21/16* (2006.01)
*G02B 21/06* (2006.01)
*G02B 21/24* (2006.01)
*G02B 21/26* (2006.01)

(52) U.S. Cl.
CPC ............ *G02B 21/06* (2013.01); *G02B 21/16* (2013.01); *G02B 21/241* (2013.01); *G02B 21/26* (2013.01); *G02B 21/34* (2013.01); *G02B 21/0016* (2013.01)

(58) Field of Classification Search
USPC ........................................................ 359/368
See application file for complete search history.

(56) References Cited

U.S. PATENT DOCUMENTS

| | | |
|---|---|---|
| 8,228,499 B2 | 7/2012 | Lippert et al. |
| 8,553,324 B2 | 10/2013 | Pacholik et al. |
| 9,042,010 B2 | 5/2015 | Widzgowski et al. |
| 9,239,454 B2 | 1/2016 | Lippert et al. |
| 9,316,824 B2 | 4/2016 | Shroff et al. |
| 2002/0139936 A1 | 10/2002 | Dumas |
| 2008/0297911 A1 | 12/2008 | Christenson et al. |
| 2009/0174937 A1 | 7/2009 | Holy et al. |
| 2009/0208072 A1 | 8/2009 | Seibel et al. |
| 2009/0272914 A1 | 11/2009 | Feng et al. |
| 2012/0129704 A1 | 5/2012 | Gunderson et al. |
| 2014/0254005 A1 | 9/2014 | Lippert et al. |

FOREIGN PATENT DOCUMENTS

| | | |
|---|---|---|
| DE | 102007038579 A1 | 2/2009 |
| DE | 102007048409 A1 | 4/2009 |
| DE | 102008038467 A1 | 2/2010 |
| DE | 102009044987 A1 | 3/2011 |
| DE | 102010007727 A1 | 8/2011 |
| DE | 102012002853 A1 | 8/2013 |
| JP | 2002048978 A | 2/2002 |
| JP | 2003177331 A | 6/2003 |
| JP | 2004317704 A | 11/2004 |
| JP | 2010541023 A | 12/2010 |
| WO | 2007065711 A1 | 6/2007 |
| WO | 20090049740 A1 | 4/2009 |
| WO | 2010012980 A1 | 2/2010 |
| WO | 2010054041 A1 | 5/2010 |
| WO | 2012122027 A2 | 9/2012 |
| WO | 2013053454 A1 | 4/2013 |
| WO | 2013132257 A1 | 9/2013 |

OTHER PUBLICATIONS

Beutter, M., International Application No. PCT/EP2014/072090, International Search Report and Written Opinion with English Translation, dated May 8, 2015, 18 pages.

ND MICROSCOPY
LIGHT MICROSCOPE WITH INNER FOCUSING OBJECTIVE AND MICROSCOPY METHOD FOR EXAMINING A PLURALITY OF MICROSCOPIC OBJECTS

The present invention relates to a light microscope for examining a plurality of microscopic objects according to the preamble of claim 1 and to a microscopy method for examining a plurality of microscopic objects according to the preamble of claim 13.

A fundamental field of application of light microscopes can be seen in the fastest possible examination of a multitude of specimens. Microscopes designed for this are also known as high throughput microscopes.

The examined specimens, which are also described as microscopic objects, can comprise for example biological organisms. The objects are often conveyed in a carrier medium, for example an aqueous medium or a gel.

In order to manage large quantities of specimens, a generic light microscope comprises a light source to illuminate a measurement region, a specimen vessel, in which the microscopic objects can be moved one after the other into the measurement region, as well as imaging means and a detection unit to measure detection light coming from a microscopic object located in the measurement region.

A corresponding generic microscopy method for examining a plurality of microscopic objects comprises at least the steps that a measurement region is illuminated, the microscopic objects are moved one after the other in a specimen vessel into the measurement region, and detection light coming from a microscopic object located in the measurement region is measured with imaging means and a detection unit.

Also in the case of microscopes and microscopy methods designed for the highest possible speed, it is desirable, with good image quality, to further increase the achievable speed. A cost-effective microscope construction is to be made possible in this way.

A generic microscope is described in U.S. Pat. No. 8,228,499 B2. Here, specimens received in a gel are conveyed one after the other into the measurement region. However, the positioning of the specimen requires a comparatively great amount of time.

A further generic microscope is described in WO 2010/012980 A1. Here, a comparatively time-consuming positioning of the specimen is indeed not necessary. On the other hand, however, the equipment configuration requirement, which comprises three microscopes arranged one behind the other, is undesirably high. A cost-effective examination of a large number of specimens is therefore likewise not possible with this microscope.

It can be regarded as an object of the invention to provide a light microscope and a microscopy method which facilitate the fastest possible and most cost-effective examination of a large number of specimens.

This object is achieved by the light microscope having the features of claim 1 and by the method having the features of claim 13.

Advantageous variants of the method according to the invention and the light microscope according to the invention are the subject matter of the dependent claims and are additionally explained in the following description.

In the light microscope of the abovementioned type, the imaging means comprise according to the invention a detection objective with stationary front optical system and movable focussing optical system, wherein the focussing optical system is arranged behind the front optical system and in front of an intermediate image plane, and can be adjusted to adjust the height of a detection plane.

In the method of the abovementioned type, according to the invention a plurality of specimen images are recorded one after the other at different detection planes with the detection unit. These detection planes are adjusted with a movable focussing optical system, which is arranged behind a stationary front optical system of the detection objective and in front of an intermediate image plane.

It can be regarded as a core idea of the invention, for height adjustment of the detection plane, which is sharply imaged on the detection unit, to avoid the need to displace the specimen. A movement of the specimen vessel is time-consuming due to the comparatively high masses to be moved. On the other hand, in the case of the focussing means the masses to be moved are low, so that a particularly high speed becomes possible.

A further fundamental idea can be seen in the arrangement and design of the focussing means as inner focussing. The focussing means are thus located in the optical path behind a stationary front optical system. The specimen or an adjacent medium are not influenced or moved when the focussing means are adjusted. In addition, the focussing means are arranged in front of an intermediate image plane. This describes the first plane, in the optical path of the detection light, which is optically conjugated to the detection plane. The detection plane is imaged with the imaging means into this intermediate image plane. By arranging the focussing means at the front in this way, a specimen can be examined with a comparatively small number of optical components. In particular, no further objectives or microscopes are required in the optical path behind the detection objective to adjust the height of the imaged detection plane. In comparison with, for example, the microscope of WO 2010/012980, the apparatus costs are considerably lowered.

All optical boundary areas from the specimen vessel to the front optical system can thus be stationary during measurements one after the other of different microscopic objects and different detection planes. These properties are highly significant in order to be able to examine large quantities of specimens with short adjustment times. As a specimen medium surrounding the specimen, for example water, is constantly in contact with the specimen vessel during a specimen movement, no optical boundary areas are moved when different microscopic objects are measured one after the other. The optical boundary areas can comprise in particular a boundary area from the specimen medium to the specimen vessel, a boundary area from the specimen vessel to a specimen vessel environment and a boundary area from the specimen vessel environment to the front optical system. Further boundary areas can be present in dependence upon the design of the specimen vessel environment. As a substantial advantage, all these optical boundary areas can remain stationary when different detection planes are imaged on the detection unit and measured one after the other.

The invention enables the detection plane to be displaced in the direction of an optical axis of the detection objective via an adjustment of the focussing means between at least some of the recordings of the specimen images. The specimen images recorded can then be put together to form a three-dimensional specimen image. To record the specimen images at different detection planes, the object examined can remain at rest. Only after completion of these recordings is the object moved out of the measurement region and a next object moved into the measurement region. This procedure is particularly preferable if a movement direction of the objects is coplanar with the detection planes.

Alternatively, a plurality of specimen images can be recorded one after the other, wherein the microscopic objects are moved at least between recordings of different specimen images, and the recorded specimen images are put together to form a three-dimensional specimen image. The specimen movement can therefore also be used to examine different specimen regions one after the other. It can be provided in this configuration to carry out a specimen movement exclusively between, but not during, recordings of specimen images. The specimen movement then does not influence the image quality and a plurality of detection planes can be examined which are offset in height relative to each other but do not have a lateral offset relative to the microscopic object. Alternatively, however, it is also preferable to continuously move the microscopic objects, thus also during a specimen recording. A high examining speed can thus be achieved, whereby interference effects are avoided through the constant movement speed of the specimens. In the case of a sufficiently fast recording the specimen movement does not have a disadvantageous effect on the image quality.

The direction of the specimen movement, with which the microscopic objects are moved one after the other through the measurement region, is perpendicular or inclined relative to a detection axis, along which the detection objective receives and forwards detection light. This detection axis can also be described as an optical axis of the detection objective. While a height adjustment of the detection plane in the direction of the detection axis is realised by the focussing means, the specimen movement causes a relative displacement, transversely thereto, between the detection plane and the specimen. For the examination of each individual microscopic specimen therefore a plurality of specimen images can also be recorded with the same setting of the focussing means, whereby, through the specimen movement, different regions of the same microscopic object are examined. These specimen images can then be put together with the specimen images, for the recording of which a setting of the focusing means was changed, in order to form an overall image.

In a preferred configuration, described in more detail below, the detection plane is inclined, thus not coplanar, relative to the movement direction of the objects. A height adjustment of the detection plane is realised, here as well, perpendicularly to the detection plane. In this variant, a measurement duration is significant. This duration can describe the time period which is required from the start of a specimen image recording of a first detection plane until a start of a specimen image recording of a detection plane adjusted with the focussing means. A flow speed, with which the microscopic objects are conveyed, and the measurement duration can be tailored to each other so that the distance between two detection planes examined one after the other relative to the object corresponds at the most to the depth of field of the recorded specimen images. The distance between the detection planes measured one after the other is therefore not expressed relative to a resting reference point here, but instead relative to the moving object. A computed overall image thereby has a desired high resolution also in the movement direction of the objects.

Specimen images are preferably automatically recorded only when a microscopic object is located in the measurement region. For this, a monitoring measurement can be carried out, with which it is determined whether a microscopic object is located in the measurement region. A recording of a plurality of specimen images at different detection planes is started only when the presence of a microscopic object has been ascertained in the measurement region. The monitoring measurement can be realised cost-effectively with a light barrier or a light scanner, which can be arranged in particular on the measurement tube in front of the measurement region. Alternatively, a transmitted light image of the measurement region can also be recorded, for example with the detection objective. In addition the recording of a first specimen image can serve as a monitoring measurement, so that adjustment of the focussing means and a further specimen image recording are only carried out if one of the microscopic objects is detected in the image.

An adjustment of the focussing optical system can be carried out in principle arbitrarily. Precise and rapid changes are possible in particular with hydraulically adjustable focussing optical systems.

The focussing optical system can comprise at least one lens that can be displaced along the optical axis of the detection objective. Particularly short adjustment times of the focussing optical system can be achieved if the focussing optical system has at least one laterally displaceable component which, in dependence upon its lateral displacement, causes different refractive powers. These components can comprise two, in particular aspherical, plates, which can be displaced laterally relative to each other to change their jointly caused refractive power. These can be so-called Alvarez plates. The direction of a lateral displacement is transverse, in particular perpendicular, to the optical axis of the detection objective.

Furthermore the focussing optical system can also have an optical component, for example a lens, the shape of which can be changed for a focus adjustment. As a change in shape, in particular a radius of curvature of one or more boundary areas of the optical component can be changed. For particularly rapid focus changes, the optical component can be an electrically tunable lens (ETL).

To convey the microscopic objects through the specimen vessel, conveying means are preferably provided. These can be for example a pump or, more generally, a means with which, by consuming energy, a controlled speed of the microscopic objects and/or a specimen medium surrounding these can be adjusted.

The specimen vessel itself preferably comprises a measurement tube, through which the microscopic objects can be transported. The measurement tube can also be formed by a tubular element or a capillary. The microscopic objects are fed to the measurement tube from a tank, the tank being for example an aquarium, a fish tank or a multiwell plate. A multiwell plate describes a specimen container with a plurality of depressions to receive the specimens separately.

In a preferred embodiment the measurement tube has a cornered cross-section. Detection light thus passes through a planar wall of the measurement tube, thereby avoiding imaging errors.

In an alternative preferred embodiment the measurement tube has a round cross-section. A particularly even specimen movement through the measurement tube is thus achieved without parts of the specimen or the specimen medium remaining stuck at corner regions of an angular measurement tube.

Apart from the shape of the measurement tube, imaging errors can also be reduced by the material of the measurement tube and the optical design of the successive components can be simplified. The material of the measurement tube and a specimen medium, in which the microscopic objects are transported through the measurement tube, can thus be selected so that their refractive indexs deviate by at most 15%, preferably at most 10%, from each other. FEP (Fluorinated Ethylene Propylene) is particularly suitable for the measurement tube and water is particularly suitable as the specimen medium, wherein a nutrient liquid or other substances can also be added to the water. PTFE (polytetrafluoroethylene) with a refractive index n of 1.35, fluoropolymer CYTOP with n=1.3402, perfluoro-dioxolane polymers with n=1.3280 to 1.3570 or Teflon AF (amorphous fluoroplastic) with n=1.3137 are also suited for an aqueous specimen medium. If glass is used instead for the measurement tube, there is a leap in the refractive index with respect to water, which is to be considered in the design of the subsequent optical system, for example by an anamorphic optical system. Instead of water, a hydrogel or a mixture of a hydrogel and water can also be used as a specimen medium.

In order to reduce leaps in the refractive index, an immersion liquid can be arranged between the measurement tube and the front optical system. A container to receive an immersion liquid is preferably present and arranged so that the immersion liquid completely surrounds a shell surface of the measurement tube at least in the region of the detection plane and so that the front optical system is in contact with the immersion liquid in a measurement operation. By the immersion liquid surrounding the measurement tube, it can serve not only to reduce leaps in the refractive number but also to adjust or maintain environment conditions, for example a certain temperature.

The measurement tube can be held so that it is either rigid or movable with respect to the detection objective. Translational displacements of the measurement tube in the direction of the optical axis and/or transversely thereto can be used to orientate the measurement tube. During the measurement operation, i.e. the recording of a plurality of specimen images at different detection planes, however, the position of the measurement tube remains unchanged in this configuration, too.

Drive means can also be provided to rotate the measurement tube about a rotation axis which coincides with a longitudinal axis of the measurement tube. The rotation axis thus extends centrally along the measurement tube and not merely parallel to the longitudinal axis thereof. If the wall of the measurement tube is rotation-symmetrical, even in case of a rotation, an optical boundary area formed by the wall also remains in the same location or stationary. Through a rotation, different specimen regions can advantageously be observed without optical boundary areas being displaced and this having to be considered in the optical path of the detection light.

The specimen vessel can also be open at the top. The front optical system can, in this embodiment, be immersed in a specimen medium in the specimen vessel, in which specimen medium the microscopic objects are located. The number of optical boundary areas is advantageously thus reduced. Here, the specimen vessel is also designed so that the microscopic objects can move therein. This movement can come from the microscopic objects themselves, for example if these are living organisms such as zebra fish. Alternatively, a movement can also be actively produced through a flow in the specimen vessel, for example by means of a pump, an agitator rod or a temperature gradient within the specimen vessel.

For a cost-effective design, which still allows precise adjustment of the detection plane, all components of the imaging means which convey detection light from the detection plane to the detection unit are arranged along precisely one optical axis. The optical axis itself can have direction changes, for example via mirrors. However, in particular no two objectives or microscopes are arranged one behind the other and inclined, as used for example in WO 2010/012980 A1, in order, inter alia, to change focussing. In such an arrangement the optical axis of the rear microscope is inclined relative to an intermediate image plane produced by the first microscope, whereby the imaging means are not arranged along one, but instead along at least two optical axes.

The type of microscopy can be in principle arbitrary in the invention. For example, confocal filtering can be carried out. In this case the illuminating light is guided via the detection objective to the specimen.

The light microscope is, however, particularly preferably designed for single plane illumination microscopy (SPIM). For this, the microscope has a illumination objective separate from the detection objective to guide illuminating light, which is emitted from the light source, into the measurement region. The illuminating objective is arranged so that its optical axis is perpendicular to an optical axis of the detection objective. Thus, a propagation direction of the illuminating light can lie in the detection plane, whereby specimen regions above and below the detection plane are advantageously not illuminated, or hardly illuminated. As is also the case with a confocal measurement, a high depth resolution can be achieved with SPIM. The required measurement duration is, however, comparatively low, which is advantageous for reaching a high specimen throughput.

The detection objective can be arranged with its optical axis perpendicular to the longitudinal axis of the measurement tube. Undesired optical effects of the measurement tube can thus be kept low.

Alternatively, the detection objective can, however, also be arranged so that its optical axis is orientated at an angle different from 90° relative to a longitudinal axis of the measurement tube. For a SPIM measurement, an illumination objective can be arranged perpendicularly to the detection objective and thus also inclined relative to the longitudinal axis of the measurement tube. It is thereby advantageously ensured that a specimen movement which takes place in the longitudinal direction of the measurement tube is inclined with respect to the detection plane. The specimen movement thus has a direction component in the height direction of the detection objective, i.e. along an optical axis of the detection objective. The specimen movement thus leads to a relative height adjustment between the detection plane and the specimen.

Thus, with electronic control means, a desired height interval between two detection planes measured one after the other can thus be adjusted relative to the specimen by the focussing means and the specimen movement being controlled in dependence upon each other.

For example, the electronic control means can adjust the detection plane between two specimen image recordings in a direction which has one direction component opposite to the movement direction of the microscopic object by means of the focussing optical system. A plurality of specimen images can thus be recorded more rapidly for one microscopic object than would be possible solely through the specimen movement.

Alternatively or additionally, the electronic control means can also be adapted to adjust the detection plane between two specimen image recordings by means of the focussing optical system in a direction which has a direction component in the movement direction of the microscopic objects. For example, a comparatively high flow speed of the microscopic objects is hereby possible, wherein at the same time a high number of specimen images can be recorded for a certain microscopic object.

In addition, this variant is advantageous if a first specimen image is initially evaluated with image processing means and further specimen images are to be recorded in dependence upon an evaluation result. In this case a specimen movement, which is carried out during the transmission, processing and evaluation of the first specimen image, can be at least partially compensated by the focussing means displacing the detection plane.

In principle, the speed of the specimen movement can also be adjusted so that it is lower than a displacement speed of the detection plane through the focussing optical system. For a detection plane, for example if a specimen region of interest is identified there, further detection planes can subsequently be examined which are displaced relative to the specimen in the direction of, or counter to, the specimen movement.

For a particularly rapid specimen examination, at least one second detection objective can also be provided, so that different detection planes can be simultaneously imaged with the detection objectives. The detection objectives can guide detection light either temporally one after the other to the same detection unit, or simultaneously to different detection units.

In particular for single plane illumination microscopy, it is useful to simultaneously change the course of the illuminating light during an adjustment of the focussing optical system. The illuminating light is thus to be displaced in such a way that it constantly runs along the momentarily imaged detection plane. For this, scanning means can be arranged in a pupil of an illumination objective, with which illuminating light is guided into the measurement region. Through an arrangement in the pupil, a change of the light deflection direction of the scanning means causes a displaced course of the illuminating light in the specimen vessel.

In general, a detection plane can be understood to be a plane within the specimen vessel which is imaged with the detection objective on the detection unit. Different regions of the plane can also be imaged one after the other on the detection unit, for example in case of confocal measurements.

The detection unit is in principle any light-sensitive measurement unit. It preferably comprises at least one two-dimensional camera sensor in order to be able to measure a detection plane at a point in time.

The measurement region can be identical to the detection plane. This is the case for example with SPIM, where precisely the detection plane is illuminated. If regions above or below the detection plane are also illuminated, the measurement region can also be understood to be the region within the specimen vessel which is illuminated and can then emit detection light, which can reach the detection unit via the detection objective.

The illuminating light of the light source can in principle be of any type, in particular either wide-band or limited to one or more narrow wavelength ranges. The light source can in principle also be arbitrarily structured and comprise for example one or more lasers.

The detection light is understood to be light which comes from the specimen as a result of the irradiation of the specimen with illuminating light. The detection light can thus be fluorescent light or also other luminescent light or scattered, reflected or diffracted illuminating light.

Figure 2:
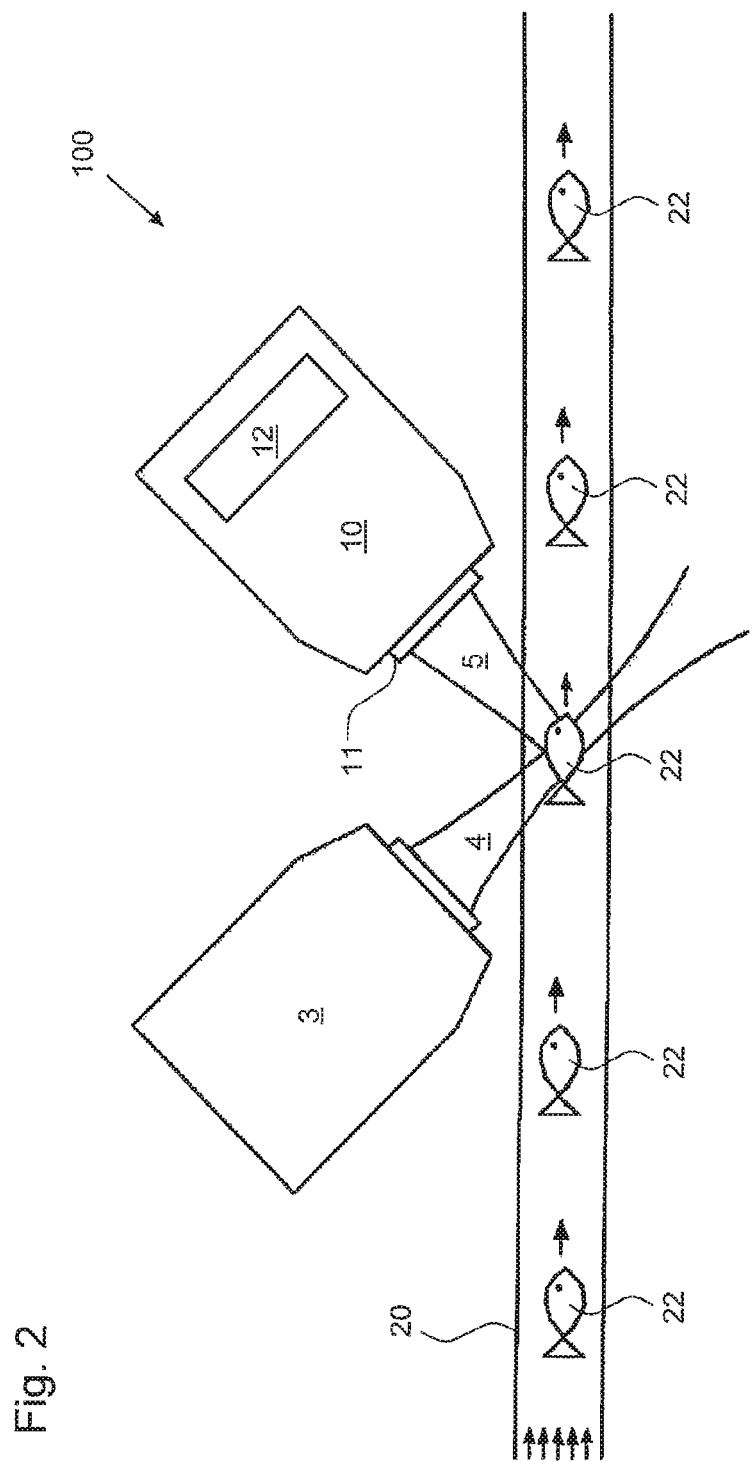

Further features and advantages of the invention are described below by reference to the attached schematic figures, in which FIG. 1 shows an exemplary embodiment of a light microscope according to the invention, FIG. 2 shows a cut-out of a further exemplary embodiment of a light microscope according to the invention.

Same parts and those having the same effect are generally provided with the same reference numerals in the figures.

FIG. 1 shows schematically a first exemplary embodiment of a light microscope 100 according to the invention. The light microscope 100 comprises as essential components a detection objective 10 and a specimen vessel 20, in which microscopic objects 22 to be examined can be located.

The microscopic objects 22 in the example shown are zebra fish 22. These are located in an aqueous specimen medium which completely fills the specimen vessel 20 in order to avoid variable air chambers and imaging effects thereby caused.

The specimen vessel 20 is formed as a measurement tube 20. This connects a tank 1 to a discharge system 2. The measurement tube 20 is supplied with microscopic objects from the tank 1. A pump can be provided in order to convey the specimen medium and thus the zebra fish 22 through the measurement tube 20. Alternatively, the zebra fish 22 can, however, also move with their own force through the measurement tube 20. The discharge system 2 can form a circuit to the tank 1.

By the specimens 22 being moved one after the other through a measurement region in the measurement tube 20, specimens 22 can be examined with a high throughput. The measurement region is formed, in the case shown, via a detection plane 15 which images the detection objective 10 on a detection unit 30. Detection light coming from an illuminated specimen 22 is provided with the reference numeral 5 in the figure.

A light source (not shown) illuminates the measurement region and hence the detection plane. The light microscope 100 is preferably designed for single plane illumination microscopy. For this, illuminating light is guided transversely, in particular perpendicularly, to an optical axis of the detection objective 10 to the specimen 22. In FIG. 1, the optical axis of the detection objective 10 runs vertically and the propagation direction of the illuminating light runs into the paper plane or out of it. Thus, essentially only the detection plane 15 is illuminated.

In order to examine different detection planes 15, 16 which are offset relative to each other in the direction of the optical axis, in conventional microscopes in most cases the distance 6 between the specimen vessel 20 and the objective 10 is changed. However, this is relatively time-consuming due to the large masses therewith moved. In addition, a changing distance 6 has disadvantageous effects on the optical design. An adjustment of for example a zoom optical system arranged after the objective is also relatively time consuming.

On the other hand, the invention allows a rapid adjustment of the detection plane 15 or 16 imaged on the detection unit 30 by a focussing optical system 12 being adjusted. This is located in the objective 10 behind a front optical system 11 of the objective 10. Through this arrangement, a movement of the focussing optical system 12 does not influence optical boundary areas and dimensions between the specimen vessel 20 and the objective 10.

The focussing optical system 12 is additionally arranged before or in front of an intermediate image plane, into which an image of the detection plane 15 or 16 is imaged with the objective 10. An optical path from the intermediate image plane to the detection unit 30 is thereby independent of a selection of one of the detection planes 15 or 16, i.e. no optical elements have to be changed between the intermediate image plane and the detection unit 30 in dependence upon which detection plane 15 or 16 is to be imaged. A simple and cost-effective microscope construction can hereby be realised. It is relevant for this that, by means of the focussing optical system 12, solely a portion of the optical path from the specimen 22 to the first intermediate image plane is influenced.

By means of the focussing optical system 12 a particularly rapid height change of the detection plane can be set. For this, the focussing optical system 12 can preferably comprise Alvarez plates.

The measurement tube 20 remains stationary during a plurality of successive measurements of different detection planes 15, 16. Before this or subsequently, the measurement tube 20 can, however, also be displaced in the three spatial directions 29 or rotated in the direction of the arrow 28 about its longitudinal axis.

In order that specimen images are only recorded at different detection planes 15, 16 when a microscopic object 22 is actually being conveyed through the detection plane 15, 16, a monitoring measurement can be carried out. This is carried out, in the example shown, with a light barrier 18, wherein, in principle, the detection objective 10 can also be used for this.

Particularly rapid specimen examinations are possible if the microscope 100 is designed for single plane illumination microscopy. The movement direction of the microscopic objects 22, i.e. the longitudinal direction of the measurement tube 20, can lie parallel to the detection planes 15, 16, as is the case in FIG. 1.

In a particularly preferred alternative, however, detection planes are examined which lie inclined relative to the longitudinal axis of the measurement tube 20. An embodiment, designed for this, of a light microscope 100 according to the invention is shown in a cut-out in FIG. 2.

This shows an illumination objective 3 which guides illuminating light 4 into the measurement region in the measurement tube 20, as well as the detection objective 10 which forwards detection light 5 out of the measurement region.

The optical axes of the two objectives 3 and 4 are perpendicular to each other and respectively inclined relative to the longitudinal axis of the measurement tube 20. An adjusting device of the detection plane has, through the focussing optical system 12, a direction component in the longitudinal direction of the measurement tube 20. A relative displacement between the momentarily imaged detection plane 15 or 16 and a microscopic object 22 in a direction, which has a direction component perpendicular to this detection plane 15 or 16, can be realised both via the focussing means 12 and also via the specimen movement through the measurement tube 20. These two adjustment possibilities offer a particularly high flexibility in the specimen examination, which can be used in particular to increase the examining speed.

The light microscope 100 according to the invention thus offers the possibility of examining specimens 22 with a particularly high throughput. There, a three-dimensional specimen image is determined by recording a plurality of planes 15, 16, offset relative to each other in the height direction, of the same specimen 22.

LIST OF REFERENCE NUMERALS

1 Tank
2 Discharge system
3 Illumination objective
4 Illuminating light
5 Detection light
10 Detection objective
11 Front optical system
12 Focussing optical system
15 Detection plane
16 Further detection plane
18 Light barrier
20 Specimen vessel, measurement tube
22 Microscopic objects, specimens
28 Spatial directions for displacement of the measurement tube 20
29 Rotation direction of the measurement tube 20
30 Detection unit
100 Light microscope

The invention claimed is:

1. A light microscope for examining a plurality of microscopic objects, comprising:
a light source to illuminate a measurement region,
a specimen vessel, in which the microscopic objects can be moved one after the other into the measurement region, the specimen vessel including a measurement tube,
imaging means and a detection unit to measure detection light coming from a microscopic object located in the measurement region,
wherein
the imaging means comprise a first detection objective with a stationary front optical system and a movable focusing optical system which is arranged behind the front optical system and in front of an intermediate image plane and can be adjusted for height adjustment of a detection plane,
electronic control means are provided and adapted to adjust, between two specimen image recordings, the detection plane by means of the focusing optical system in a direction which has a direction component in a movement direction of the microscopic objects, wherein
a plurality of specimen images are recorded one after the other,
the microscopic objects are moved at least between recordings of different specimen images, and
the recorded specimen images are put together to form a three-dimensional specimen image.

2. The light microscope according to claim 1, wherein
all optical boundary areas from the specimen vessel to the front optical system are stationary during successive measurements of different microscopic objects and different detection planes.

3. The light microscope according to claim 1, wherein
the focusing optical system has at least one laterally displaceable component which causes different refractive powers in dependence upon its lateral displacement.

4. The light microscope according to claim 1, wherein
the focusing optical system has an optical component, a shape of which can be changed for a focus adjustment.

5. The light microscope according to claim 1, wherein
conveying means are provided to convey the microscopic objects through the measurement tube.

6. The light microscope according to claim 1, wherein
an illumination objective is provided to guide illuminating light into the measurement region and is arranged so that its optical axis is perpendicular to an optical axis of the first detection objective.

7. The light microscope according to claim 1, wherein
the first detection objective is arranged so that its optical axis is at an angle differing from 90° relative to a longitudinal axis of the measurement tube.

8. The light microscope according to claim 1, wherein
a second detection objective is provided and arranged so that two different detection planes can be simultaneously imaged with the first and second detection objectives.

9. A microscopy method for examining a plurality of microscopic objects, comprising:
illuminating a measurement region in a specimen vessel with a light source,
wherein the specimen vessel includes a measurement tube in which the microscopic objects can be moved one after the other into the measurement region,
measuring detection light coming from a microscopic object located in the measurement region with an imaging means and a detection unit; wherein the imaging means includes a detection objective with a stationary front optical system and a movable focusing optical system which is arranged behind the front optical system and in front of an intermediate image plane and can be adjusted for height adjustment of a detection plane,
providing and adapting an electronic control means to adjust, between two specimen image recordings, the detection plane by means of the focusing optical system in a direction which has a direction component in a movement direction of the microscopic objects, wherein
a plurality of specimen images are recorded one after the other,
the microscopic objects are moved at least between recordings of different specimen images, and
the recorded specimen images are put together to form a three-dimensional specimen image.

10. The microscopy method according to claim 9, further comprising:
arranging the detection objective so that its optical axis is at an angle differing from 90° relative to a longitudinal axis of the measurement tube.

11. The microscopy method according to claim 10, further comprising:
providing an illumination objective to guide illuminating light into the measurement region, wherein the illumination objective is arranged so that its optical axis is perpendicular to an optical axis of the detection objective.

12. The light microscope according to claim 5, wherein
a container for receiving an immersion liquid is provided and arranged so that the immersion liquid completely surrounds a shell surface of the measurement tube at least in the region of the detection plane and that the front optical system is in contact with the immersion liquid in a measurement operation.

13. The light microscope according to claim 1, wherein
the specimen vessel is open at the top, and
the front optical system is immersed in a specimen medium, located in the specimen vessel, in which specimen medium the microscopic objects are located.

* * * * *